United States Patent [19]
Skyba

[11] Patent Number: 6,149,133
[45] Date of Patent: *Nov. 21, 2000

[54] RATCHET PULLEY FOR TIGHTENING CORDS OR ROPES

[76] Inventor: Helmut K. Skyba, Rte. 2, Box 330, Wild Rose, Wis. 54984

[*] Notice: This patent is subject to a terminal disclaimer.

[21] Appl. No.: 08/974,177

[22] Filed: Nov. 19, 1997

Related U.S. Application Data

[63] Continuation-in-part of application No. 08/719,636, Sep. 25, 1996, Pat. No. 5,722,640.
[51] Int. Cl.$^7$ ....................................................... B66D 1/30
[52] U.S. Cl. ......................... 254/391; 254/371; 254/374
[58] Field of Search .................................. 254/371, 372, 254/374, 333, 391; 226/182, 193

[56] References Cited

U.S. PATENT DOCUMENTS

| | | |
|---|---|---|
| D. 266,828 | 11/1982 | Prete, Jr. . |
| 1,185,179 | 5/1916 | Chattaway . |
| 2,802,366 | 8/1957 | Borner . |
| 2,967,046 | 1/1961 | Ratcliff . |
| 4,151,980 | 5/1979 | Burton et al. . |
| 4,185,360 | 1/1980 | Prete, Jr. et al. . |
| 4,542,883 | 9/1985 | Rutzki . |
| 4,639,978 | 2/1987 | Boden . |
| 5,368,281 | 11/1994 | Skyba . |
| 5,722,640 | 3/1998 | Skyba ..................................... 254/371 |

FOREIGN PATENT DOCUMENTS 2272020  5/1974  France .

*Primary Examiner*—Katherine Matecki
*Attorney, Agent, or Firm*—Ryan Kromholz & Manion

[57] ABSTRACT

A ratchet-type tensioning mechanism for a rope or cord has a rotatable sheave with faces having improved outwardly extending serrations which include alternating primary and secondary projections. The secondary projections are located in valleys between pairs of primary projections. A releasable ratchet mechanism permits rotation of the sheave in one direction but not the other. The projections are positioned at regular intervals around the circumference of the sheave and located so that a primary projection on one face of the sheave faces a secondary projection in a valley on the opposite face of the sheave.

7 Claims, 3 Drawing Sheets

RATCHET PULLEY FOR TIGHTENING CORDS OR ROPES

This application is a continuation-in-part of application Ser. No. 719,636, filed Sep. 25, 1996, now U.S. Pat. No. 5,722,640 issued Mar. 3, 1998.

BACKGROUND OF THE INVENTION

The present invention relates to an improved sheave for use in applications, such as in a winch or ratchet, wherein a rope is pulled under tension by either manual or power-driven rotational forces applied to the sheave. This invention relates to pulleys for tightening and tensioning ropes or cords having a ratchet mechanism to permit retaining the same under tension, and more particularly, to such a mechanism which employs the improved sheave to secure a cord or rope which is reeved therein.

Various ratcheting mechanisms have been heretofore used to tighten belts for such applications as tie down straps for securing a load on a vehicle, for boat mooring or anchor systems, tree seats or climbing aids, or other applications wherein it is desirable to be able to tighten a strap which subsequently can easily be released.

Efforts have also heretofore been made to develop sheaves which enable applications of tensile forces to single loops of ropes, cords or cables. In order to ensure adequate gripping of the rope, it has been felt necessary to utilize pointed teeth for this purpose. See for example, British Patent No. 1,233,174 or U.S. Pat. No. 4,151,980, issued May 1, 1979 to Burton et al. The sharp teeth utilized, however, tend to rapidly fray a rope or cord, greatly reducing the service life of the rope or cord due to the rapid destruction thereof. A need has thus existed for improved sheaves and ratchet pulleys employing the same, which would have improved effectiveness in pulling a rope while avoiding shortening the service life thereof.

SUMMARY OF THE INVENTION

The invention comprises an improvement in the art of rope tightening mechanisms which utilize raised internal ridges or serrations in a pulley wheel or sheave. The invention also represents and improvement over the device shown in my U.S. Pat. No. 5,368,281 issued Nov. 29, 1994. More particularly, the invention relates to such a device which contains serrations that extend generally radially from the base of the sheave on each surface thereof but the ends of which are angled in order to grasp a rope or cord sheave thereover more firmly in one direction than the other. Specifically, in accordance with the present invention, the ridges or serrations on the sheave are formed so that they extend generally radially from the hub thereof.

In accordance with one aspect of the invention, a sheave is provided having opposed surfaces which form a serpentine channel for grasping a rope. In accordance with a related aspect, the components forming the facing surfaces of the sheave utilize unsharpened or slightly rounded surfaces which effectively can grip a rope but do not damage the rope as it travels around the pulley.

In accordance with a further related aspect of the invention, the working surfaces of the sheave have alternating, interfitting projections and channels or valleys, which channels progressively narrow in dimension from the outer perimeter 28 of the sheave to its inner hub.

In accordance with a further aspect of the invention, each valley, formed between primary projections on the face of the sheave, is provided with a small, rounded, generally radially extending secondary projection or ridge on the floor surface of each valley. In accordance with this aspect of the invention, the presence of such small, preferably rounded ridges enables application of substantial pulling forces to a rope which would otherwise more easily slip along the surface of the sheave. It is believed that the opposing primary ridge forces a cord or rope into its opposing valley and tightly against the secondary ridge, which thus substantially increases the ability of the sheave to retain and apply tensile forces to a rope without slippage thereof in an axial direction. Preferably, the ridges are all angled toward the direction of rotation of the sheave when a rope reeved thereon is tightened.

An important aspect and advantage of the present invention is the provision of a sheave which allows for easier release of the rope or cord but which still provides a secure gripping thereof in order to secure the tension of the rope. A further aspect of the invention is to provide ridges or serrations which are rounded and thus do not cause undue fraying of the rope or cord. A further aspect of the invention relates to the provision of a flat surface at the bottom of the sheave which does not cause undue wedging of the cord therein which prevents removal thereof.

Still a further aspect of the invention relates to providing a ratcheting sheave in which an end of a rope inserted thereon is accurately guided around the circumference of the sheave so that the entire circumference thereof comes into contact with the rope. A related aspect involves placement of the sheave within a housing that is provided with closely fitting surfaces that guide and force the rope into close contact with the sheave.

Briefly summarized, the invention provides a ratchet-type tensioning mechanism for a rope or cord having a rotatable sheave with faces having radially extending serrations. A releasable ratchet mechanism permits rotation of the sheave in one direction but not the other. A plurality of serrations having alternating primary and secondary ridges and opposed valleys circumscribes the sheave, each of which has a generally radially extending portion extending outwardly from the base of the sheave, the ridges being positioned at regular intervals around the circumference of the sheave and being located so that a ridge on one face of the sheave faces a secondary ridge in a valley on the opposite face of the sheave. The housing within which the sheave is fitted includes a curved surface that guides the rope into contact with the sheave especially adjacent to the opening which forms the point of entry of the rope into the sheave. The rope exiting side of the housing is provided with an opening to permit access, and preferably, manual turning of the sheave. A further point of constriction that maintains the rope in the sheave is provided adjacent to the point of exit of the rope from the housing.

Various other aspects and advantages of the invention will become apparent in connection with the accompanying drawings wherein:

DETAILED DESCRIPTION

Figure 1:
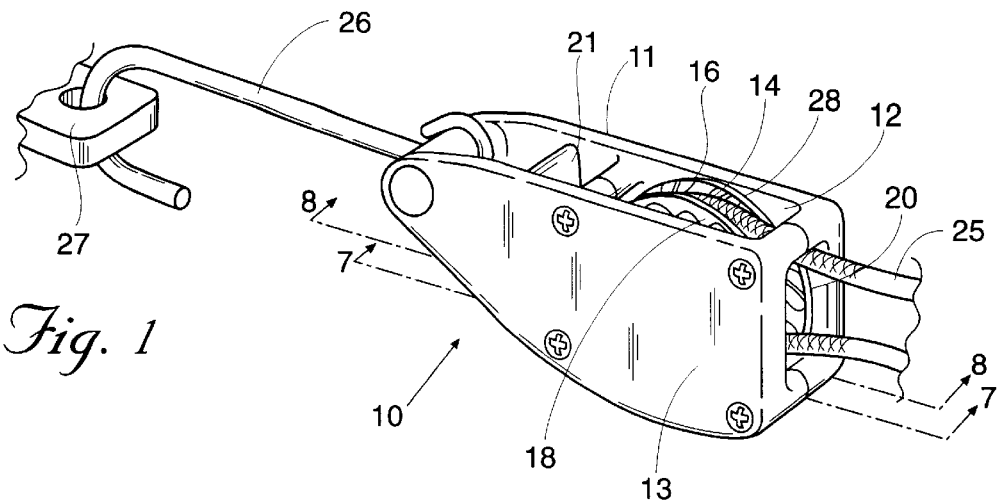
FIG. 1 is a perspective view of an embodiment of a rope tightening device of this invention.
Figure 2:
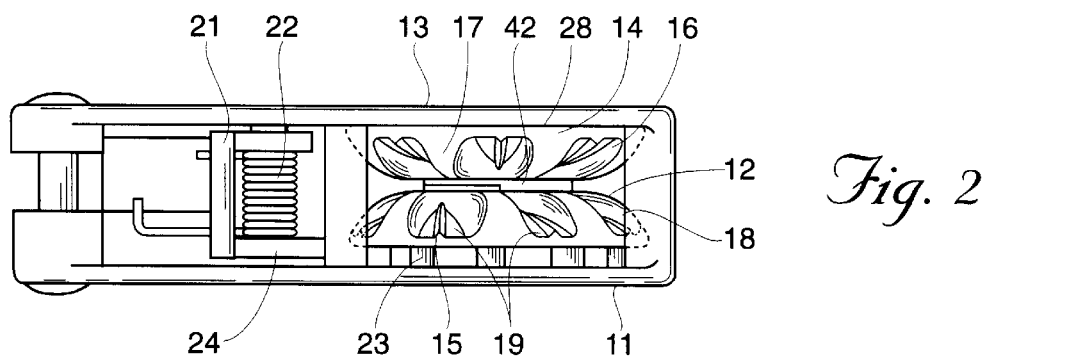
FIG. 2 is a top view of the tightening device of FIG. 1 with the rope removed.
Figure 6:
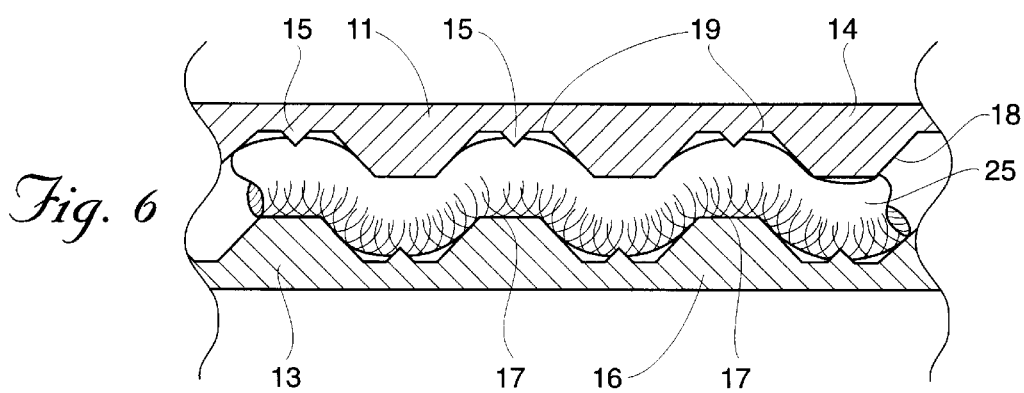
FIG. 6 is a fragmentary top view showing a rope in the sheave of FIG. 2.

Referring more specifically to the drawings, one form of tensioning mechanism 10, intended to be tightened by hand, is shown in FIG. 1. Device 10 includes a housing 12 formed from divisible halves 11 and 13 which are attached together as seen in FIG. 2 by conventional mechanical fasteners. Rotatably held within housing 12 is a sheave 14. Sheave 14, for ease of manufacture, is formed from halves 16 and 18. Halves 16 and 18 may be threaded together as shown in my '281 patent, a nut 30 being formed integrally with one of the halves in order to facilitate threading of the two halves together. One half 16 may have a central protrusion 32 formed integrally therewith and sized to fit within central opening 34 of the opposite half 18. The inner face of each half of sheave 14 is provided with alternating primary projections 17 and valleys 19. Secondary ridges or projections 15 are formed within each of the valleys 19. As best seen in FIGS. 2 and 6, the primary projections 17 on one half of the sheave are aligned with secondary projections 15 of their opposed valleys 19 on the other half to thereby form a tortuous path for engagement of a rope or cord 25.

The faces of the halves 11 and 13 are oriented so that a series of primary projections 17 and secondary projections 15 are provided around the entire circumferential face of each of the halves 11 and 13. When assembled, primary projections 17 alternate with valleys 19 along or near the center of which are provided the secondary projections 15. The two surfaces are placed in an alignment where each primary projection 17 is in alignment with the secondary projection 15 of the opposite sheave surface.

Figure 3:
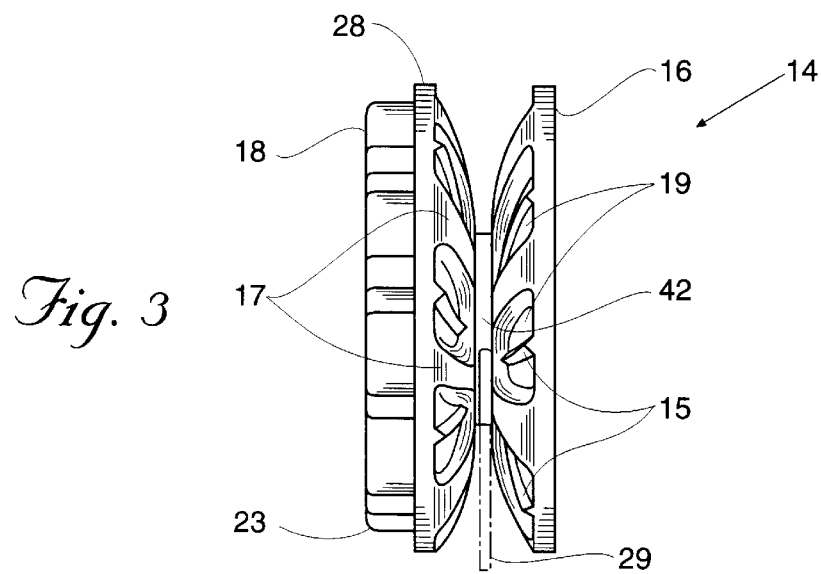
FIG. 3 is a front elevational view of a sheave of this invention.

A central hub surface 42 is located at the central part of the sheave 14. A series of ratchet teeth 23 may be provided on one or both of the sheave halves 11 and 13 in order to provide a capability of one way ratchet advancement of the rope 25. Note, also in FIG. 3 that the inner sheave surfaces converge arcuately toward the center of the sheave. The primary projections 17 and the secondary projections 15 as well as the valleys 19 within which the secondary projections 17 are located, all also converge generally, in angled fashion toward the hub surface 42. Thus, a highly effective but non-destructive wedging action on the rope is provided.

Further details of the assembly of the ratchet mechanism are set forth in detail in my above-mentioned U.S. Pat. No. 5,368,281, the entire text of which is incorporated herein by reference. Housing 12 forms a chamber within which the sheave can rotate without necessarily being mounted on an axle connected to the chamber. If desired, however, the housing 12 could be designed with appropriate sockets so that a central axle fitted through central opening 36 could be used. Alternatively, the axle may be formed integrally with one or both sheave halves 16 and 18.

Opening 20 is of a restricted width such that the rope 25 is prevented thereby from passing around the outside of the sheave 14 thereby preventing wedging of the rope between sheave 14 and housing 12. The opening also guides the rope 25 around sheave 14 to ensure maximum contact thereof with the sheave 14.

Figure 7:
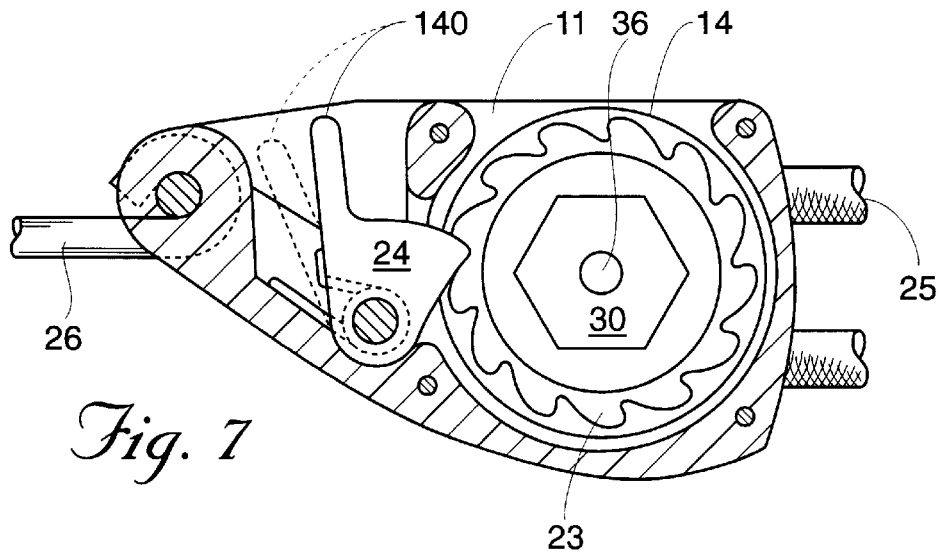
FIG. 7 is a cross-sectional view taken along line 7—7 of FIG. 1 with the release mechanism in the released position.
Figure 8:
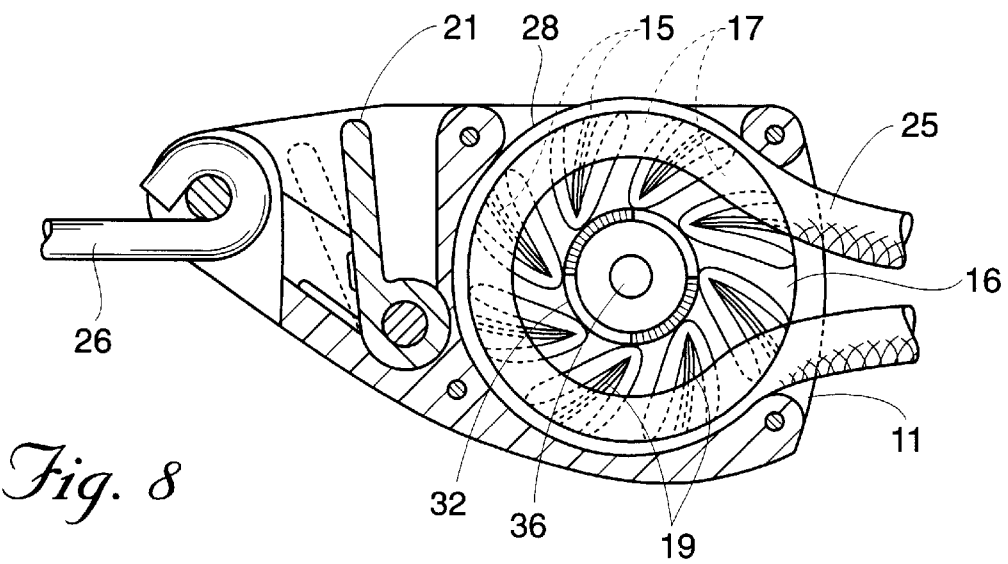
FIG. 8 is a cross-sectional view of the device of FIG. 1 taken along line 8—8.

The device is also provided with a ratchet mechanism 21 which is spring loaded by spring 22 to engage teeth 23 on a sprocket formed integrally with half 18 of the sheave. Pawl 24 of ratchet mechanism 21 is urged by spring 22 into the spaces between the teeth 23 of the sheave. As seen in FIG. 7, a rope 25 reeved on sheave 14 is permitted to move only in the direction of the arrow when pawl 24 engages sprocket 23. However, when the ratchet mechanism is pivoted as shown by the phantom lines, the sheave 14 is permitted to rotate in the counterclockwise direction thereby permitting loosening of rope 25.

The end of the device opposite rope 25 is secured by appropriate means such as a hook 26 to a fastening means 27 to be placed under tension. Means 27 can be, for example, a strap on a load secured to a motor vehicle, a strap on a platform for attachment to a pole or tree, or, for example, a fastening device for mooring watercraft.

Figure 4:
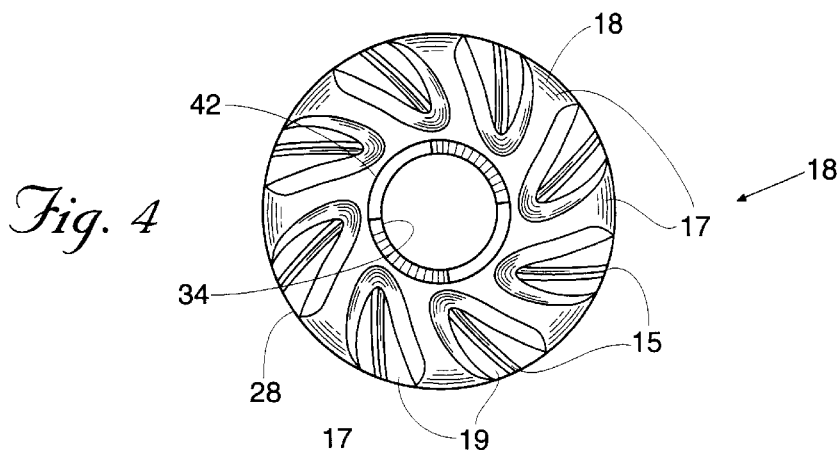
FIG. 4 is a cross-sectional view of one-half of the sheave of FIG. 2 taken along line 4—4.
Figure 5:
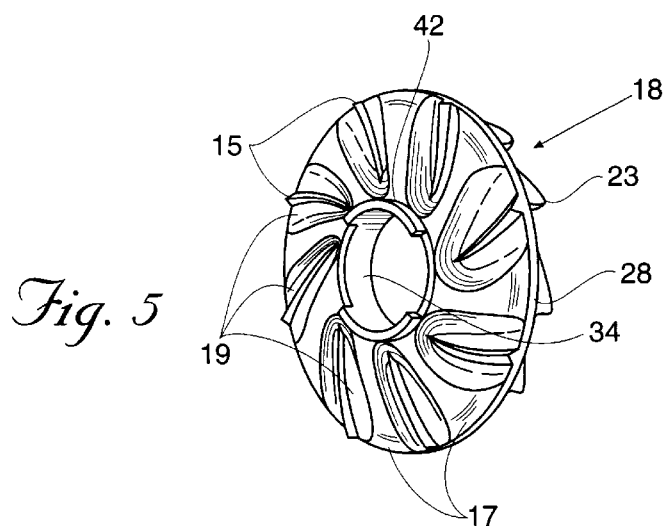
FIG. 5 is a perspective view of the sheave half of FIG. 4.

As best seen in FIG. 4, each of the projections 15 and 17 is generally radially extending. However, in addition to following the curvilinear surface of the sheave faces 16 and 18, the projections 15 and 17 are preferably angled in the direction in which the sheave rotates when the rope 25 is being tensioned. Thus, as used herein, the term "radially" is intended to refer to any line extending outwardly from the hub surface 42 toward the outer perimeter 28 of sheave 14. Another aspect of the invention is that the base of the sheave does not form a sharp "V" but rather hub surface 42 is flattened, thereby preventing rope 25 from being too tightly wedged in the sheave during tightening.

It has been found that angling of projections 15 and 17 as shown assists in aggressive engagement of rope 25 to feed the same readily into the sheave when an end thereof is presented thereto as the sheave is rotated. However, the rope can nonetheless readily be loosened so the same can be removed without binding in the sheave. Flattened surface 42 also assists in ready release of rope 25 especially in the case of larger diameter sheaves. A stripper element as shown in my '281 patent, and by phantom lines 29, can optionally be used to assist in removal of the rope 25 from sheave 14, if needed.

Referring to FIG. 6, it will be noted that each of the primary projections 17 will force a rope 25 into a serpentine path. This serpentine path causes the rope to be alternately pushed into valleys 19 of sheaves halves 16 and 18. Stretching of rope 25 into such a serpentine orientation imposes tensile forces on and hardens the surface of rope 25. The secondary ridges 15 are found, due to their firm engagement with the hardened surfaces of the rope, to provide an extremely effective locking of rope 25 against axial slippage. While such slippage was common with prior art pulleys, the configuration of this invention greatly minimizes such slippage.

While the invention has been described and illustrated in detail, it is to be understood that various modifications may be made within the spirit of the invention. Thus the scope thereof is limited only by the terms of the following claims and equivalents thereof.

I claim:

1. A sheave for advancing a rope looped around said sheave by application of rotational forces thereto comprising
   a central hub and opposed, facing first and second surfaces arcuately outwardly extending from said hub to an outer perimeter,
   each of said opposed surfaces being provided with alternating primary ridges and valleys extending from said hub to said outer perimeter, the primary ridges of said first one of said surfaces being aligned with a valley of the opposed second surface, said valleys being tapered in width toward said hub of said sheave and having a generally flat floor surface, the center of each said valley having a secondary ridge projecting from said floor surface, said secondary ridges each being of a height extending above its associated valley floor surface that is substantially less than the height of said primary ridges, each of said secondary ridges being in at least approximate alignment with a primary ridge of said facing sheave surface.

2. A sheave according to claim 1 wherein said sheave is formed of two halves fitted together and is provided with a central opening which forms an axis of rotation.

3. A sheave according to claim 1 wherein said primary and secondary projections and said valleys are angled in a selected rotational direction from said hub and are oriented generally radially outwardly toward said perimeter.

4. In a ratchet-type tensioning mechanism for a rope or cord comprising a rotatable sheave having serrations on the faces thereof and a releasable ratchet mechanism to permit rotation of said sheave in one direction but not the other, the improvement wherein said sheave comprises a central hub and opposed, facing first and second surfaces arcuately outwardly extending from said hub to an outer perimeter, each of said opposed surfaces being provided with alternating primary ridges and valleys extending from said hub to said outer perimeter, the primary ridges of said first one of said surfaces being aligned with a valley of the opposed second surface, said valleys being tapered in width toward said hub of said sheave and having a generally flat floor surface, the center of each said valley having a secondary ridge projecting from said floor surface, said secondary ridges each being of a height extending above its associated valley floor surface that is substantially less than the height of said primary ridges, each of said secondary ridges being in at least approximate alignment with a primary ridge of said facing sheave surface.

5. A tensioning mechanism according to claim 4 wherein said projections and valleys have rounded edges whereby a rope or cord reeved thereon does not become frayed.

6. A device according to claim 4 wherein the housing has a opening aligned with said sheave through which a rope can be reeved thereon.

7. In a ratchet-type tensioning mechanism for a rope or cord comprising a rotatable sheave having radially extending serrations on the faces thereof and a releasable ratchet mechanism to permit rotation of said sheave in one direction but not the other, the improvement which comprises a plurality of serrations having alternating projections and valleys with secondary projections centrally located in each of said valleys circumscribing each of the two opposing faces of said sheave, said projections being positioned at regular intervals around the circumference of said sheave and being located so that a primary projection on one face of said sheave faces a secondary projection on the opposite face of said sheave, said sheave being mounted in a housing having a narrow opening which feeds the rope onto said sheave and prevents wedging of the rope between the sheave and the housing and which feeds the rope around the circumference of said sheave.

* * * * *